United States Patent Office 3,211,527
Patented Oct. 12, 1965

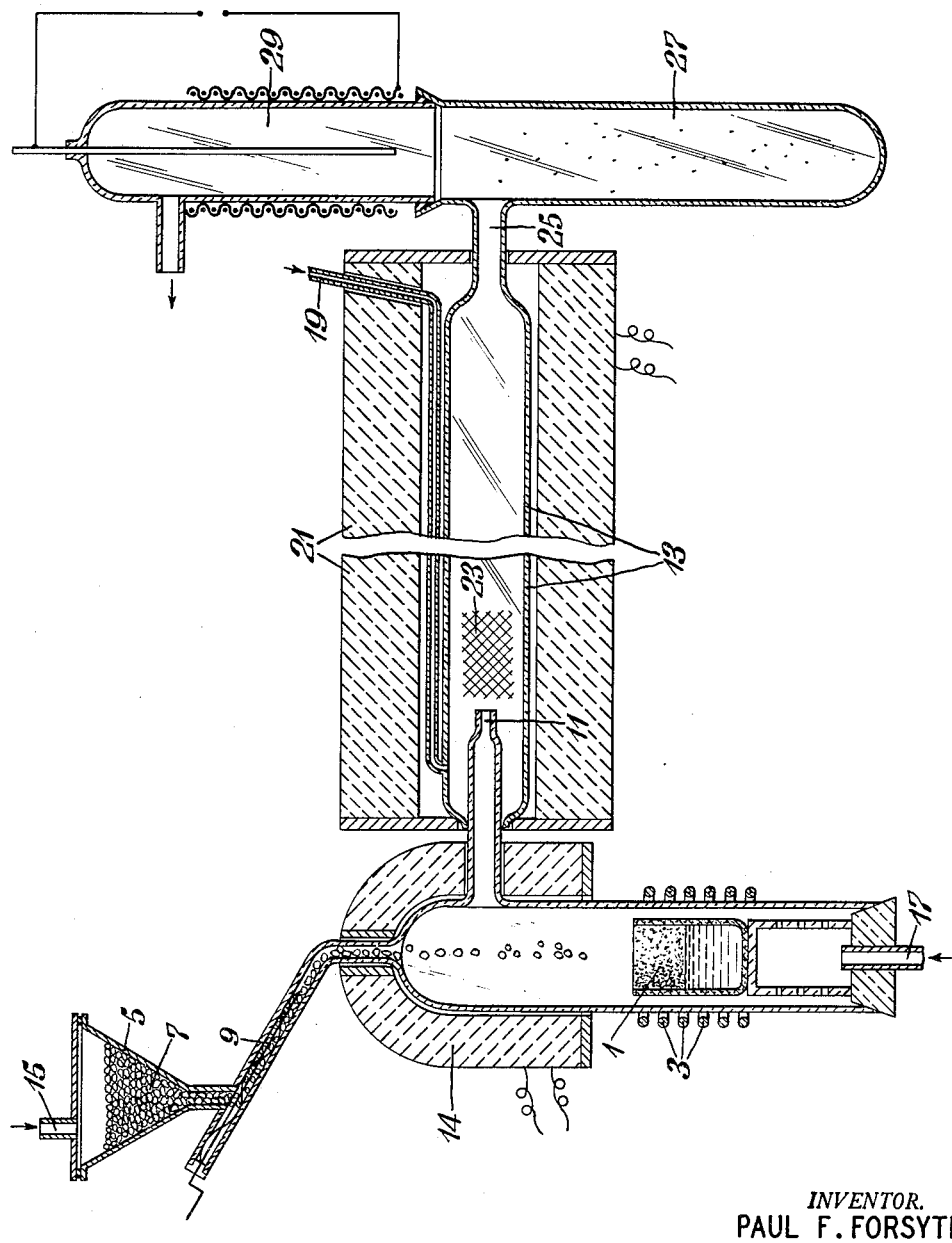
INVENTOR.
PAUL F. FORSYTH
ATTORNEY

3,211,527
PROCESS FOR PRODUCING ULTRAFINE
SILICON NITRIDE
Paul F. Forsyth, Lewiston, N.Y., assignor to Union
Carbide Corporation, a corporation of New York
Filed May 28, 1962, Ser. No. 198,262
1 Claim. (Cl. 23—191)

The present invention relates to the production of ultrafine silicon nitride. More particularly, the present invention relates to a process for producing ultrafine silicon nitride substantially free from metallic impurities.

Silicon nitride is a hard, refractory compound which is also extremely resistant to attack by molten metals. Consequently, on account of its properties, silicon nitride is highly desirable for many industrial uses such as the manufacture of crucibles, and coatings for containers used in handling transistor grade silicon.

However, silicon nitride as presently available commercially is not completely suitable for large scale use. The difficulty with much of the commercially available silicon nitride is that its relatively large particle size makes the production of shaped articles extremely difficult. Moreover, when attempts are made to reduce its particle size by comminution, the resulting product is found to have been contaminated by significant amounts of impurities in the process.

Other efforts to provide silicon nitride in a suitable finely divided state involve the nitriding of very fine silicon powder. However, since fine silicon powder adsorbs considerable quantities of atmospheric impurities, these efforts have invariably resulted in the production of relatively highly contaminated material. Moreover, the particles obtained most often contain a core of unnitrided silicon.

It is therefore an object of the present invention to provide a process for producing high purity, ultrafine silicon nitride.

Other objects will be apparent from the following description and claim taken in conjunction with the drawing in which the figure shows an apparatus suitable for the practice of the present invention.

A process in accordance with the present invention for producing ultrafine silicon nitride comprises reacting silicon monosulfide and ammonia in a first reaction zone; subjecting the resulting reaction products to a temperature below the decomposition temperature of silicon nitride and above about 1250° C. in a second zone; removing the reaction products from the second zone, and cooling and collecting the solid material recovered from the second zone.

The solid material product obtained in the aforedescribed process is high purity silicon nitride in the form of ultrafine particles of substantially uniform size having an average diameter between about 0.5 and 2.0 microns.

The smaller particle sizes are obtained when lower temperatures in the specified range are employed.

The present invention will be more completely understood by reference to the drawing which shows an apparatus comprising means for producing silicon monosulfide vapor, a reaction vessel for reacting the silicon monosulfide with ammonia and for heat treating the reaction products, and a device for cooling and collecting the resulting solid material.

In the drawing, a crucible 1, preferably formed of graphite, is heated by means of induction coil 3, and contains ferrosilicon which is maintained in the molten state by heat from the induction coil. Hopper 5 contains iron sulfide particles 7, FeS or FeS$_2$, which are delivered into crucible 1 by way of feed mechanism 9. The iron sulfide dissolves in the molten ferrosilicon and in this manner, sulfur and silicon are brought together and reacted in a moderating medium of molten iron. The product of this reaction, silicon monosulfide, is evolved from the molten material in the form of vapor and passes through nozzle 11 into reactor 13. In passing from the crucible to the nozzle, the monosulfide vapor is maintained at a temperature of at least about 1000° C. by heater 14 to avoid condensation. In preparing silicon monosulfide by the foregoing technique it is important to maintain at least 20 percent silicon in the molten ferrosilicon to provide adequate monosulfide production.

In order to prevent diffusion of the silicon monosulfide vapor into the feeding mechanism, a slight positive pressure of inert gas, such as argon, is maintained at inlet 15 connecting with hopper 5. Additional inert gas is introduced through inlet 17 below crucible 1 in order to direct the silicon monosulfide into reactor 13. For purposes of this invention the expression inert gas includes the noble gases and also nitrogen.

The mixture of inert gas and silicon monosulfide vapor passing through nozzle 11 is contacted in the reactor 13 by ammonia gas which enters the reactor through inlet 19. In the illustrated apparatus, the ammonia is pre-heated to at least about 1400° C. by means of heater 21 which also serves to heat the reactor.

The monosulfide and ammonia, upon contacting at a temperature of at least about 1400° C., combust and react in reaction zone 23 which is spaced away from the reactor surfaces.

The products of the combustion reaction are swept from the reaction zone by virtue of the inert gas introduced at inlet 17 into the adjacent portion or heat-treatment zone of the reactor which is maintained at a temperature below the decomposition temperature of silicon nitride, i.e., 1900° C., and above about 1250° C. As a practical matter, the temperature in the reaction vessel is maintained below about 1550° C. which is satisfactory for the practice of the present invention and permits the use of conventional materials of construction. The products of the combustion are thus subjected to a further heat treatment after combusion before exiting the reactor in the inert gas stream through outlet 25. The material from the heat treating zone exiting the reactor is cooled in receptacle 27 and the resulting solid material is deposited in the lower portion of receptacle 27 by means of electrostatic precipitator 29.

The product obtained in the receptacle is ultrafine silicon nitride in the form of substantially uniform particles averaging less than about 2.0 microns in diameter.

In addition to its highly desirable particle size, the produced silicon nitride is of very high purity.

The aforedescribed process can be seen to comprise sequential steps of combustion, and subsequent heat-treatment of the combustion products. Both of these steps have been found to be essential to the production of significant quantities of ultrafine silicon nitride.

Without intending to be bound by the following hypothesis, it is believed that the reactions which take place as a result of practicing the process of the present invention are as follows:

$$SiS + 2NH_3 \rightarrow Si(NH)_2 + H_2S + H_2$$
$$2Si(NH)_2 \rightarrow Si_2N_3H + NH_3$$
$$3Si_2N_3H \rightarrow 2Si_3N_4 + NH_3$$

The first reaction represents the combustion of monosulfide and ammonia while the second and third reactions represent the result of subsequent heat treating the combustion products.

The production of silicon nitride, $Si_3N_4$, is believed to result from the decomposition of silicam ($Si_2N_3H$) in the temperature range of 1250° C. to 1900° C. In any event, the combustion reaction products must be heat-treated upon removal from the reaction zone and before cooling so that substantially all of the combined silicon and nitrogen is in the form of $Si_3N_4$. If this heat treatment is not provided, significant amounts of silicon nitride are not obtained. The necessary heat treatment can be conveniently provided by employing a longitudinally extending reactor of the type illustrated in the drawing whereby the combustion reaction products are exposed to a temperature of 1250° C. to 1500° C. before cooling so that the combined silicon and nitrogen in the initial reaction product are converted to $Si_3N_4$.

The following example is provided to further illustrate the present invention.

EXAMPLE I

An apparatus of the type illustrated in the drawing was employed to produce submicron silicon nitride. The length of the reactor of the apparatus was about 4 feet and the diameter of the reactor was about 1½ inches.

Pellets containing a mixture of FeS and ferrosilicon (50% silicon) were introduced into the crucible containing molten ferrosilicon. The molten ferrosilicon initially contained 20 percent silicon and was maintained at a temperature of about 1550° C. The weight ratio of FeS to ferrosilicon in the pellets introduced into the molten ferrosilicon was about 0.8.

As the pellets were dropped into the molten ferrosilicon, clouds of silicon monosulfide vapor were evolved. By virtue of inert gas introduced thereof inlets 15 and 17 the monosulfide vapor was directed through the nozzle of the apparatus into the reactor. The monosulfide vapor was maintained at a temperature of about 1000° C. during its passage to the reactor. Ammonia gas preheated to about 1400° C. was introduced into the reactor by way of inlet 19 at a rate of about 6–8 liters per minute. Upon contact in the reactor, the ammonia and silicon monosulfide combusted in the reaction zone. The products of combustion were swept from the reaction zone through the remaining portion of the reactor which was maintained at a temperature between 1250° C. and 1500° C. The reaction material ultimately exited the reactor and the solid product was precipitated in the collector.

The solid product thus obtained was found to be substantially uniform particles of silicon nitride having an average particle size of less than 0.5 micron.

The following table shows the amounts of metallic impurities in the silicon nitride material of this invention as determined by spectrochemical analysis.

Table I

| | | | |
|---|---|---|---|
| Fe | 0.07 | Ti | <0.01 |
| B | 0.002 | Ni | 0.01–0.10 |
| Ca | <0.01 | Mo | <0.01 |
| Cu | 0.01–0.1 | Ag | <0.01 |

From the foregoing description it can be seen that the present invention represents a significant industrial benefit by providing a relatively simple process for producing ultrafine, high purity silicon nitride.

In addition to the previously mentioned uses, the product of the present invention can be advantageously employed as a filler for plastic, rubber and silicon compounds. The product silicon nitride can also be used for mold lubrication, insulation, coating, polishing, bulking, anticaking, and antislip formulations.

Although the present application refers to a particular manner of preparing silicon monosulfide for use in this invention by the reaction of molten ferrosilicon, it is to be understood that other techniques for preparing silicon monosulfide vapor can be employed such as by the direct heating of solid silicon monosulfide or silicon disulfide to about 1000° C. to 1200° C.

What is claimed is:

A method for producing particles of silicon nitride averaging less than about 2 microns in diameter which comprises directing a stream of silicon monosulfide vapor mixed with inert gas into an elongate reactor containing ammonia, said stream of silicon monosulfide and inert gas being initially at a temperature of at least about 1000° C.; spontaneously reacting the silicon monosulfide and ammonia by combustion in a reaction zone in the reactor; removing the resulting reaction product material from the first reaction zone to a second zone in the reactor maintained at a temperature between about 1250° C. and 1500° C., to convert combined silicon and nitrogen in the reaction product material to $Si_3N_4$; removing the thus formed $Si_3N_4$ from the reactor by means of the inert gas introduced into the reactor with the silicon monosulfide vapor; and cooling and collecting the $Si_3N_4$ removed from the reactor.

References Cited by the Examiner

Mellor, "Comprehensive Treatise on Inorganic and Theoretical Chemistry" (1925), vol. 6, part 2, p. 986.
Chem. Abs., vol. 52, 2629 (1958).

MAURICE A. BRINDISI, *Primary Examiner.*